United States Patent
Yoshida

(10) Patent No.: US 10,789,101 B2
(45) Date of Patent: Sep. 29, 2020

(54) INFORMATION PROCESSING APPARATUS, PROCESSING DISTRIBUTION METHOD, AND STORAGE MEDIUM

(71) Applicant: FUJITSU LIMITED, Kawasaki-shi, Kanagawa (JP)

(72) Inventor: Taketoshi Yoshida, Kunitachi (JP)

(73) Assignee: FUJITSU LIMITED, Kawasaki (JP)

(*) Notice: Subject to any disclaimer, the term of this patent is extended or adjusted under 35 U.S.C. 154(b) by 184 days.

(21) Appl. No.: 16/056,598

(22) Filed: Aug. 7, 2018

(65) Prior Publication Data

US 2019/0065262 A1  Feb. 28, 2019

(30) Foreign Application Priority Data

Aug. 23, 2017  (JP) ................................. 2017-160179

(51) Int. Cl.
*G06F 9/50* (2006.01)
*G06F 9/48* (2006.01)

(52) U.S. Cl.
CPC ............ *G06F 9/505* (2013.01); *G06F 9/4843* (2013.01); *G06F 9/5027* (2013.01)

(58) Field of Classification Search
CPC ............. H04L 67/1095; H04L 67/1097; H04L 67/1002; H04L 67/325; G06F 11/1461; G06F 11/3419; G06F 16/27; G06F 9/4881

See application file for complete search history.

(56) References Cited

U.S. PATENT DOCUMENTS

| | | | | |
|---|---|---|---|---|
| 2012/0233419 A1* | 9/2012 | Yamashita | .......... | G06F 11/1461 711/162 |
| 2016/0041885 A1* | 2/2016 | Arai | .................... | G06F 11/1451 714/19 |
| 2016/0171070 A1* | 6/2016 | Hrle | ....................... | G06F 16/273 707/615 |
| 2016/0308721 A1* | 10/2016 | Dellisanti | .............. | H04L 69/28 |
| 2017/0093975 A1* | 3/2017 | Raghunath | .......... | H04L 67/1097 |
| 2018/0101399 A1* | 4/2018 | Jain | ........................ | G06F 9/4881 |
| 2019/0245918 A1* | 8/2019 | Xu | ....................... | G06F 16/1748 |

FOREIGN PATENT DOCUMENTS

| | | | |
|---|---|---|---|
| JP | 2014-186364 A | 10/2014 | |
| JP | 2016-162170 A | 9/2016 | |

* cited by examiner

*Primary Examiner* — Dong U Kim

(74) *Attorney, Agent, or Firm* — Fujitsu Patent Center

(57) ABSTRACT

A non-transitory computer-readable storage medium storing a program that causes a computer to execute a process, the process includes calculating, when a request for a processing for a plurality of apparatuses is received, an estimated processing time period that is an estimated value of a time period taken to perform the processing based on a processing time period in a past execution history of the processing; referring to a time schedule that records a schedule of processing including replication for each of the plurality of apparatuses; and selecting one of the plurality of apparatuses as a target apparatus for performing the requested processing based on a sum total of overlapping times between the calculated estimated processing time period and the recorded schedule.

13 Claims, 14 Drawing Sheets

FIG. 4

| PROCESSING REQUEST ID | PROCESSING TYPE | STORAGE NODE ID | DATA SIZE [MB] | OBJECT ID | REQUEST RECEIPT TIME | ENDING TIME |
|---|---|---|---|---|---|---|
| MSG10 | PUT | SN1 | 100 | OBJ10 | 08:10 | 08:12 |
| MSG20 | GET | SN3 | 40 | OBJ20 | 08:11 | 08:12 |
| MSG30 | GET | SN2 | 80 | OBJ30 | 08:12 | 08:14 |

FIG. 5

| OBJECT ID | REPLICATION SOURCE STORAGE NODE ID | REPLICATION DESTINATION STORAGE NODE ID | DATA SIZE [MB] | START TIME | ENDING TIME |
|---|---|---|---|---|---|
| OBJ10 | SN1 | SN2 | 100 | 08:11 | 08:13 |
| | SN1 | SN3 | 100 | 08:12 | 08:14 |

FIG. 6

| STORAGE NODE ID | PROCESSING REQUEST ID | PROCESSING TYPE | ESTIMATED PROCESSING START TIME | ESTIMATED PROCESSING ENDING TIME |
|---|---|---|---|---|
| SN1 | MSG10 | PUT | 08:10 | 08:12 |
| SN1 | MSG10 | RPG | 08:11 | 08:14 |
| SN2 | MSG10 | GPP | 08:11 | 08:13 |
| SN2 | MSG30 | GET | 08:12 | 08:14 |
| SN3 | MSG10 | RPP | 08:12 | 08:14 |
| SN3 | MSG20 | GET | 08:11 | 08:12 |

FIG. 7

| OBJECT ID | REPLICATION SOURCE STORAGE NODE ID | REPLICATION DESTINATION STORAGE NODE ID | DATA SIZE [MB] | START TIME | ENDING TIME |
|---|---|---|---|---|---|
| OBJ10 | SN1 | SN2 | 100 | 08:11 | 08:13 |
| | SN1 | SN3 | 100 | 08:12 | 08:14 |

FIG. 8

| OBJECT ID | REPLICATION SOURCE STORAGE NODE ID | REPLICATION DESTINATION STORAGE NODE ID | DATA SIZE [MB] | START TIME | ENDING TIME |
|---|---|---|---|---|---|
| OBJ10 | SN1 | SN2 | 100 | 08:11 | 08:13 |

FIG. 9

| OBJECT ID | REPLICATION SOURCE STORAGE NODE ID | REPLICATION DESTINATION STORAGE NODE ID | DATA SIZE [MB] | START TIME | ENDING TIME |
|---|---|---|---|---|---|
| OBJ10 | SN1 | SN3 | 100 | 08:12 | 08:14 |

FIG. 13

| STORAGE NODE ID | PROCESSING REQUEST ID | PROCESSING TYPE | ESTIMATED PROCESSING START TIME → ESTIMATED PROCESSING ENDING TIME 8:10  8:11  8:12  8:13  8:14  8:15 |
|---|---|---|---|
| SN1 | MSG10 | PUT | →  |
| SN1 | MSG10 | RPG | - - - → |
| SN2 | MSG10 | RPP | - - → |
| SN2 | MSG30 | GET | → |
| SN3 | MSG10 | RPP | - - - → |
| SN3 | MSG20 | GET | → |

INFORMATION PROCESSING APPARATUS, PROCESSING DISTRIBUTION METHOD, AND STORAGE MEDIUM

CROSS-REFERENCE TO RELATED APPLICATION

This application is based upon and claims the benefit of priority of the prior Japanese Patent Application No. 2017-160179, filed on Aug. 23, 2017, the entire contents of which are incorporated herein by reference.

FIELD

The embodiment discussed herein is related to an information processing apparatus, a processing distribution method, and a storage medium.

BACKGROUND

A system redundancy technique for performing data replication at a plurality of storage nodes is used. For example, a proxy server assigns processing for registering or referring to data to any one of the storage nodes.

As related art, a distribution processing system is disclosed for assigning task processing to each node based on the schedule of a processing target file or a task schedule being processed and managing the execution state of the task processing (see, for example, Japanese Laid-open Patent Publication No. 2014-186364).

As related art, a technique is disclosed for synchronizing replication information and status information between storage apparatuses and transmitting the replication information and the status information to a management server (see, for example, Japanese Laid-open Patent Publication No. 2016-162170).

It is considered that upon receiving a processing request made for a storage node, a proxy server calculates the processing loads of storage nodes and assigns processing to one of the storage nodes with a low processing load. For example, the proxy server receives data and transmits the data to the selected storage node. The storage node that received the data transfers the data to another storage node, so that replication of the data is performed.

However, if the accuracy of calculation of the processing load of each storage node decreases, processing may be assigned to a storage node with a high processing load. This increases load imbalance between a plurality of storage nodes. It is desirable that a load imbalance between a plurality of storage nodes be suppressed.

SUMMARY

According to an aspect of the invention, a non-transitory computer-readable storage medium storing a program that causes a computer to execute a process, the process includes calculating, when a request for a processing for a plurality of apparatuses is received, an estimated processing time period that is an estimated value of a time period taken to perform the processing based on a processing time period in a past execution history of the processing; referring to a time schedule that records a schedule of processing including replication for each of the plurality of apparatuses; and selecting one of the plurality of apparatuses as a target apparatus for performing the requested processing based on a sum total of overlapping times between the calculated estimated processing time period and the recorded schedule.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of processing request management information;

FIG. 5 is a diagram illustrating an example of replication management information;

FIG. 6 is a diagram illustrating an example of a time schedule;

FIG. 7 is a diagram illustrating an example of replication management information stored by a storage node 3 (SN1);

FIG. 8 is a diagram illustrating an example of replication management information stored by a storage node 3 (SN2);

FIG. 9 is a diagram illustrating an example of replication management information stored by a storage node 3 (SN3);

FIG. 13 is a diagram illustrating a time schedule in an application example.

DESCRIPTION OF EMBODIMENT

<Example of Entire Configuration of System According to Embodiment>

Figure 1:
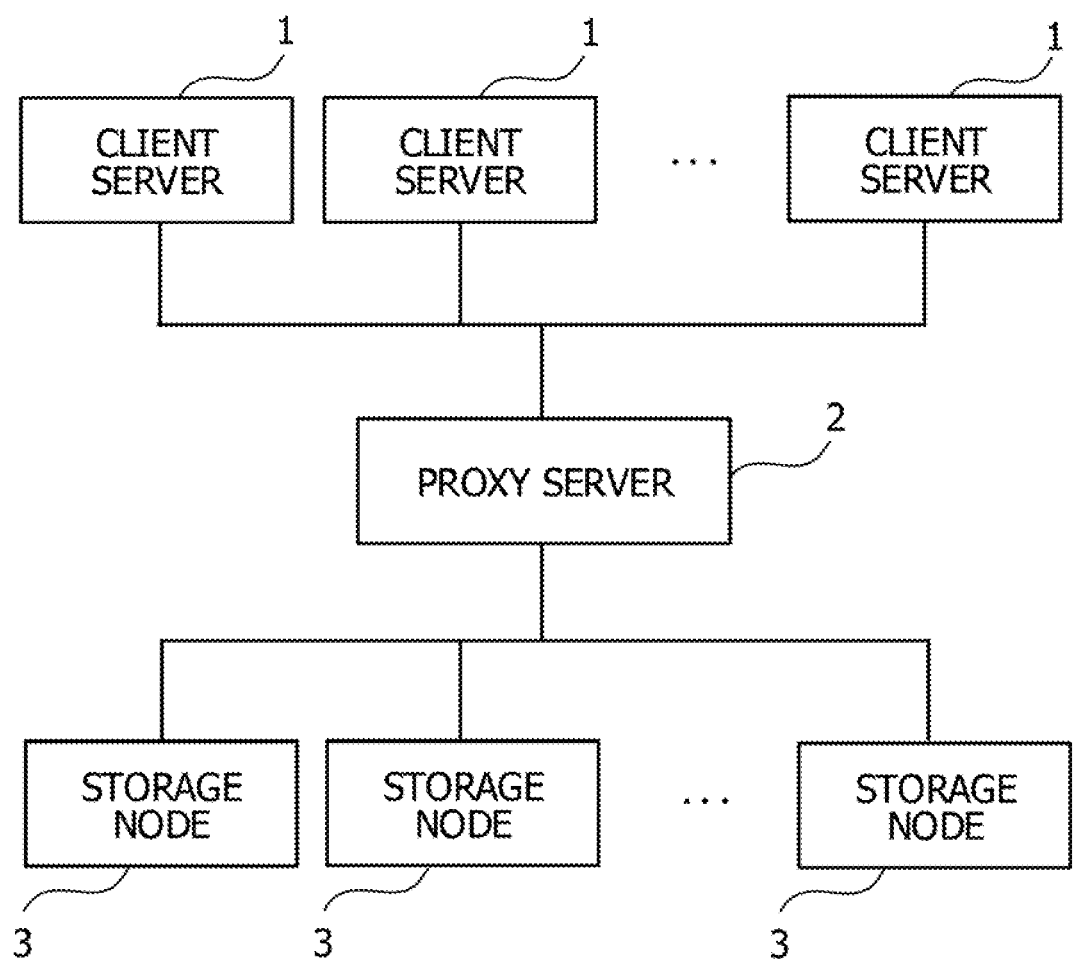
FIG. 1 is a diagram illustrating an example of the entire configuration of a system according to an embodiment.

An embodiment will be described below with reference to the accompanying drawings. FIG. 1 is a diagram illustrating an example of the entire configuration of a system according to an embodiment.

As illustrated in FIG. 1, a system according to an embodiment includes a plurality of client servers 1, a proxy server 2, and a plurality of storage nodes 3.

The client server 1 transmits to the proxy server 2 a request for processing for registrating data in the storage node 3 or a request for processing for referring to data stored in the storage node 3 in accordance with the operation of a user. The number of the client servers 1 may be one.

When receiving the registration processing request from the client server 1 along with registration target data, the proxy server 2 transmits the registration target data to one of the storage nodes 3. When receiving the reference processing request from the client server 1, the proxy server 2 acquires data from one of the storage nodes 3. The proxy server 2 performs the scheduling management of processing performed based on a request from the client server 1. The proxy server 2 is an example of an information processing apparatus.

When receiving registration target data from the proxy server 2, the storage node 3 stores the registration target data. The storage node 3 transfers the registration target data to another storage node 3, so that the replication of the registration target data is performed. When receiving the reference processing request from the proxy server 2, the storage node 3 transmits reference target data to the proxy server 2. The storage node 3 may be, for example, a database server or a storage device such as a network attached storage (NAS).

<Example of Proxy Server>

Figure 2:
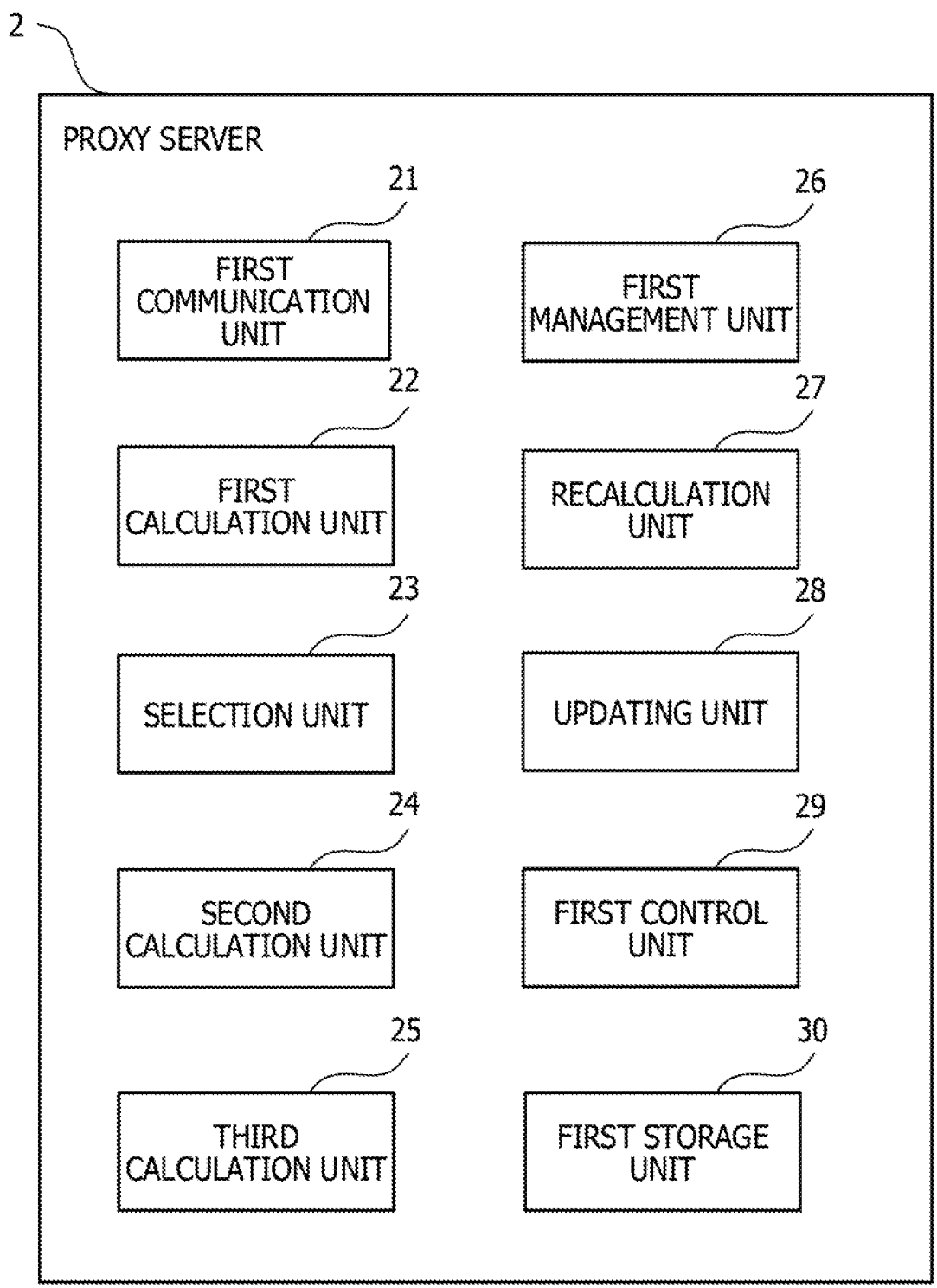
FIG. 2 is a diagram illustrating an example of a proxy server.

FIG. 2 is a diagram illustrating an example of the proxy server 2. The proxy server 2 includes a first communication unit 21, a first calculation unit 22, a selection unit 23, a second calculation unit 24, a third calculation unit 25, a first management unit 26, a recalculation unit 27, an updating unit 28, a first control unit 29, and a first storage unit 30.

The first communication unit 21 transmits/receives various pieces of data to/from the client servers 1 and the storage nodes 3. The first communication unit 21 receives from the client server 1 the request for processing for registering data in the storage node 3 or the request for processing for referring to data stored in the storage node 3.

When receiving the registration processing request along with registration target data, the first communication unit 21 transmits the registration target data to one of the storage nodes 3. When receiving the reference processing request, the first communication unit 21 acquires reference target data from one of the storage nodes 3 and transmits the reference target data to the client server 1.

When receiving the registration processing request or the reference processing request made for the storage node 3, the first calculation unit 22 calculates for each of the storage nodes 3 an estimated processing time period that is the estimated value of a time period desired for registration processing or reference processing based on a time period desired for registration processing or reference processing in the past. The time period desired for registration processing or reference processing in the past is a processing time period in a past execution history stored in the first storage unit 30. The estimated processing time period calculated by the first calculation unit 22 does not include a time period taken for replication.

In a case where requested processing is the registration processing, the first calculation unit 22 calculates for each of the storage nodes 3 an estimated time period taken by the proxy server 2 to write data in the storage node 3. The estimated time period is calculated using the following equation where Tp represents a data write time period. Tp is also used for an estimated replication time period to be described below.

$$Tp = \text{data amount} \div p \text{ performance} \times Wps \times \left(1 + \frac{Mgn \times Mpn}{\sqrt{(Mgn + Mpn)^2}}\right) \quad (1)$$

In this equation, put multiplicity (Mpn) represents the current multiplicity of write processing at each of the storage nodes 3. The write processing is processing for registering (storing) data in the storage node 3. In this equation, get multiplicity (Mgn) represents the multiplicity of read processing at each of the storage nodes 3. The read processing represents processing in which the storage node 3 refers to data.

P performance represents the performance of the write processing at each of the storage nodes 3, and is, for example, an average data write amount per hour in the past.

The p performance is calculated in advance using the following equation based on a processing result in a certain time period and is updated at the time the completion of the registration processing.

*p* performance=total data write amount/total write time period

Wps represents a weight used in the calculation of Tp. The initial value of Wps is set to 1, and the value of Wps is corrected using the following equation (1-1) at the time of completion of the registration processing. Tpr represents an actual write time period and is recorded at the time of completion of the registration processing.

$$Wps = \text{the last } Wps + (Tpr - Tp) \times (Tp/Tpr) \quad (1\text{-}1)$$

In a case where requested processing is the reference processing, the first calculation unit 22 calculates for each of the storage nodes 3 an estimated time period taken by the proxy server 2 to read data from the storage node 3. For the calculation of the estimated time period, Tg calculated from the following equation is used.

$$Tg = \text{data amount} \div g \text{ performance} \times Wgs \times \left(1 + \frac{Mgn \times Mpn}{\sqrt{(Mgn + Mpn)^2}}\right) \quad (2)$$

In this equation, g performance represents the performance of the read processing at each of the storage nodes 3 and is, for example, an average data read amount per hour in the past. The g performance is calculated in advance using the following equation based on a processing result in a certain time period and is updated at the time the completion of the reference processing.

*g* performance=total data read amount/total read time period

Wgs represents a weight used in the calculation of Tg. The initial value of Wgs is set to 1, and the value of Wgs is corrected using the following equation (2-1) at the time of completion of the reference processing. Tgr represents an actual read time period and is recorded at the time of completion of the reference processing.

$$Wgs = \text{the last } Wgs + (Tgr - Tg) \times (Tg/Tgr) \quad (2\text{-}1)$$

The selection unit 23 refers to a time schedule recording the schedule of processing at each of the storage nodes 3. Based on a sum total ST(n) of overlapping times between the estimated processing time period calculated by the first calculation unit 22 and a recorded schedule, the selection unit 23 selects one of the storage nodes 3 as the storage node 3 where the requested processing is to be executed. The selection unit 23 calculates ST(n) for each of the storage node 3 using the following equation where n represents the storage node 3.

$$ST(n) = \sum_{i=1}^{p} (MSGing(n, i, t)) + MSGreq(n, t) \quad (3)$$

In this equation, MSGreq(n, t) represents an estimated processing time period calculated by the first calculation unit 22, MSGing(n, i, t) represents a time overlapping MSGreq (n, t) in processing i that has already been started at the storage node 3 (*n*) and is being performed, and p represents the number of pieces of processing that have already been started at the storage node 3 (n) and are being performed. The selection unit 23 calculates the sum total ST(n) of overlapping times for each of the storage nodes 3 and selects the storage node 3 having the minimum value (min(ST(n))).

In a case where the requested processing is the data registration processing, the second calculation unit 24 calculates an estimated replication start time period RTs based on the past execution history. The estimated start time period RTs is a time period between the start of data registration performed by the storage node 3 selected by the selection unit 23 and the transfer of the data to the storage node 3 that is a replication destination. The second calculation unit 24 calculates an estimated replication start time by adding the estimated start time period RTs to a registration processing start time. A vector used for the calculation of RTs will be described below.

A vector E is represented by the following equation where bef(Mgn) represents Mgn of the past (for example, the last) replication processing at the selected storage node 3, bef (Mpn) represents Mpn of the past (for example, the last) processing at the selected storage node 3, and bef(Rts) represents Rts at the start of the past (for example, the last) processing at the selected storage node 3.

$$E=(x1,y1,z1)=(bef(Mgn),bef(Mpn),bef(Rts))$$

A vector A is represented by the following equation where ave(Mgn) represents a past Mgn average value at the selected storage node 3, ave(Mpn) represents a past Mpn average value at the selected storage node 3, and ave(Rts) represents a past Rts average time period at the selected storage node 3.

$$A=(x2,y2,z2)=(ave(Mgn),ave(Mpn),ave(Rts))$$

The initial value of each element of the vector E and the vector A is 0. That is, in a case where neither the registration processing nor the reference processing is performed at the storage node 3 in the past, the value of each element of the vector E and the vector A is 0.

A vector P is represented by the following equation where Mgn, Mpn, Rts are respectively Mgn, Mpn, Rts at the selected storage node 3 at the time of calculation.

$$P=(x3,y3,z3)=(Mgn,Mpn,Rts)$$

A direction vector U is represented by the following equation.

$$U=(a,b,c)=(x2-x1,y2-y1,2z2-z1)$$

The equation of a straight line in space is represented by the following equation.

$$(x3-x1)/a=(y3-y1)/b=(z3-z1)/c$$

In the above-described equation of a straight line, the values other than z3 (RTs) are known values. The second calculation unit 24 can therefore calculate RTs by substituting known values in the above-described equation of a straight line.

In a case where the requested processing is the data registration processing, the third calculation unit 25 calculates an estimated replication time period, which is the estimated value of a time period taken to perform replication, based on a replication time period in the past execution history. An estimated replication time period at the storage node 3 that is a replication destination corresponds to a time period taken to write data in the storage node 3, and Tp calculated from Equation (1) is used as this estimated replication time period. An estimated replication time period at the storage node 3 that is a replication source is an estimated time period between the start of replication and the completion of replication performed upon all of the replication destination storage nodes 3.

The first management unit 26 manages processing request management information, replication management information, and a time schedule to be described below. The first management unit 26 updates the time schedule including the schedule of each of the storage nodes 3 based on the estimated processing time period calculated by the first calculation unit 22, the estimated start time period calculated by the second calculation unit 24, and the estimated replication time period calculated by the third calculation unit 25. For example, the first management unit 26 records an ending time in the processing request management Information and storage management Information at the end of processing. The time schedule, the processing request management information, and the storage management information will be described in detail below.

In a case where an estimated processing ending time has already elapsed and processing has yet to be completed, the recalculation unit 27 calculates an estimated processing time period of part of processing target data that has yet to be processed and updates the time schedule based on the calculated estimated time period. In the case of, for example, the registration processing, the recalculation unit 27 sets a data amount of part of registration processing target data that has yet to be processed as the data amount in Equation (1) to calculate Tp. In the case of, for example, the reference processing, the recalculation unit 27 sets a data amount of part of reference processing target data that has yet to be processed as the data amount in Equation (2) to calculate Tg.

In a case where an estimated replication ending time has already elapsed and replication has yet to be completed, the recalculation unit 27 calculates the estimated replication time period of part of replication target data that has yet to be subjected to replication and updates the time schedule based on the calculated estimated replication time period. The recalculation unit 27 sets a data amount of part of replication processing target data that has yet to be subjected to replication as the data amount in Equation (1) to calculate Tp.

At the time of completion of processing, the updating unit 28 updates the weight (Wgs or Wps) based on the estimated processing time period and an actual time period desired for processing. In the case of the registration processing, the updating unit 28 sets an actual registration processing time period as Tpr, sets the estimated processing time period as Tp, and updates Wps using Equation (1-1). In the case of the reference processing, the updating unit 28 sets an actual reference processing time period as Tgr, sets the estimated processing time period as Tg, and updates Wgs using Equation (2-1).

At the end of replication, the updating unit 28 updates the weight (Wps) based on the estimated replication time period and an actual replication desired time period. The updating unit 28 sets the actual replication desired time period as Tpr, sets the estimated replication time period as Tp, and updates Wps using Equation (1-1).

The first control unit 29 performs various pieces of control processing in the proxy server 2.

The first storage unit 30 stores the storage management information, the processing request management information, and the time schedule.

Figure 3:
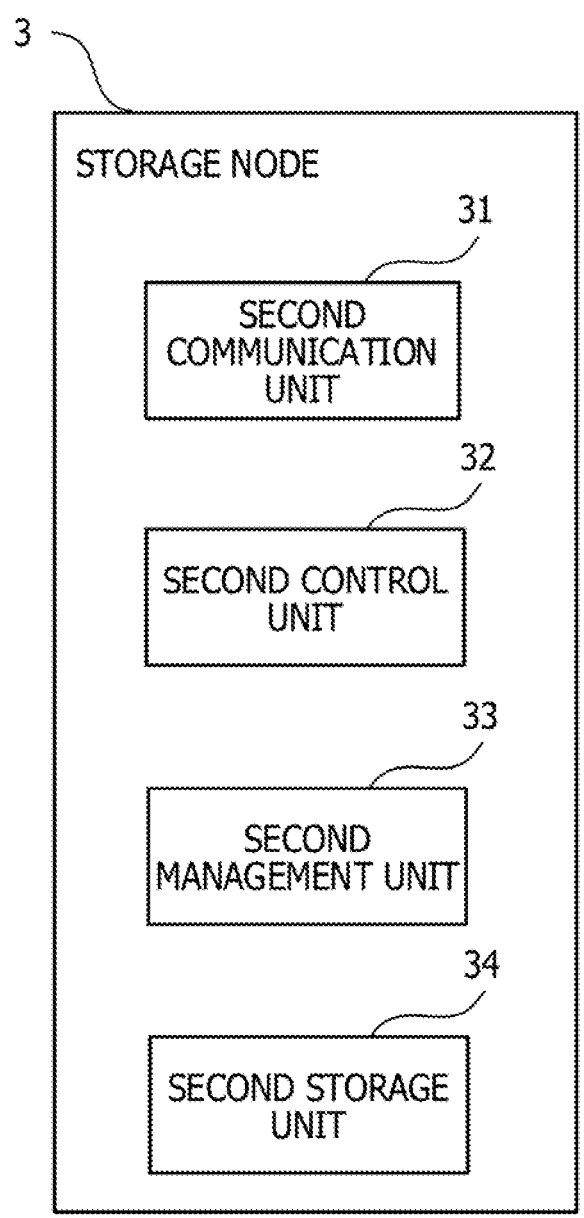
FIG. 3 is a diagram illustrating an example of a storage node.

FIG. 3 is a diagram illustrating an example of the storage node 3. The storage node 3 includes a second communication unit 31, a second control unit 32, a second management unit 33, and a second storage unit 34.

The second communication unit 31 receives registration target data from the proxy server 2. The second communication unit 31 transmits reference target data to the proxy server 2.

In a case where the storage node 3 is a transmission source in replication, the second communication unit 31 transmits the registration target data to a storage node that is a replication destination. In a case where the storage node 3 is a transmission destination in replication, the second communication unit 31 transmits registration target data to the storage node 3 that is a replication source.

The second control unit 32 controls replication processing. When receiving registration target data from the proxy server 2, the second control unit 32 transfers the registration target data to another storage node 3 via the second communication unit 31. The second control unit 32 uses the Internet protocol (IP) address of another storage node 3 stored in the second storage unit 34 at the time of, for example, replication.

The second management unit 33 records information in replication management information stored in the second storage unit 34.

The second storage unit 34 stores registration target data and the replication management information. The second storage unit 34 stores the IP addresses of other storage nodes 3.

FIG. 4 is a diagram illustrating an example of processing request management information. The first management unit 26 records information about a processing request transmitted from the client server 1 in the processing request management information.

A "processing request ID" represents identification information given to each processing request. A "processing type" represents information set based on details of processing for which a processing request has been made. For example, "PUT" represents a data registration request and "GET" represents a data reference request. A "storage node ID" represents information identifying the storage node 3 that is a processing target.

A "data size" represents the data size [MB] of processing target data. An "object ID" represents information identifying processing performed in response to a processing request. A "request receipt time" represents a time at which the proxy server 2 has received a processing request from the client server 1. An "ending time" represents a time at which processing performed in response to a processing request has been completed.

FIG. 5 is a diagram illustrating an example of replication management information. The replication management information is updated by the first management unit 26.

As an "object ID" and a "data size", pieces of information that are the same as the "object ID" and the "data size" included in the processing request management information illustrated in FIG. 4 are recorded. A "replication source storage node ID" represents information identifying the storage node 3 that receives registration target data from the proxy server 2 and transmits the registration target data to the storage node 3 that is a replication destination. A "replication destination storage node ID" represents information identifying the storage node 3 that receives registration target data from the replication source storage node 3 and stores the registration target data.

A "start time" represents a time at which replication has started. An "ending time" represents a time at which replication has been completed.

FIG. 6 is a diagram illustrating an example of a time schedule. In the time schedule, the first management unit 26 records the processing schedule of each of the storage nodes 3. In the example illustrated in FIG. 6, as a "storage node ID" and a "processing request ID", pieces of information that are the same as those included in the processing request management information illustrated in FIG. 4 are recorded.

As a "processing type", "RPG" and an "RPP" are recorded in addition to the "PUT" and the "GET" included in the processing request management information. The "RPG" represents read processing at a replication source. The "RPP" represents write processing at a replication destination. In a case where the "processing type" is "PUT", replication is performed. Therefore, records including "RPG" and "RPP" are added.

As an "estimated processing start time" in processing other than replication, a time at which the proxy server 2 has received a processing request from the client server 1 is recorded. In this embodiment, a time period between the receipt of a processing request from the client server 1 at the proxy server 2 and the start of processing at the proxy server 2 is disregarded. As an "estimated processing start time" in replication, a time obtained by adding the estimated start time period RTs calculated by the second calculation unit 24 to a time at which the replication source storage node 3 has received registration target data is recorded.

As an "estimated processing ending time" in the registration processing, a time obtained by adding the estimated time period Tp calculated by the first calculation unit 22 to the "estimated processing start time" is recorded. As an "estimated processing ending time" in the reference processing, a time obtained by adding the estimated time period Tg calculated by the first calculation unit 22 to the "estimated processing start time" is recorded.

As an "estimated processing ending time" in the replication processing at the replication destination storage node 3, a time obtained by adding the estimated time period Tp calculated by the third calculation unit 25 to the "estimated processing start time" is recorded. As an "estimated processing ending time" in the replication processing at the replication source storage node 3, the latest one of the "estimated processing ending times" at the corresponding replication destination storage nodes 3 is recorded.

FIG. 7. Is a diagram illustrating an example of replication management information stored by the storage node 3 (SN1). The replication management information illustrated in FIG. 7 is stored in the second storage unit 34 in the storage node 3 (SN1). The replication management Information illustrated in FIG. 7 is obtained by copying a record included in the replication management information illustrated in FIG. 5 which is stored by the proxy server 2. The record includes SN1 as the replication source storage node ID or the replication destination storage node ID.

FIG. 8 is a diagram illustrating an example of replication management information stored by the storage node 3 (SN2). The replication management information illustrated in FIG. 8 is stored in the second storage unit 34 in the storage node 3 (SN2). The replication management information Illustrated in FIG. 8 is obtained by copying a record included in the replication management information illustrated in FIG. 5 which is stored by the proxy server 2. The record includes SN2 as the replication source storage node ID or the replication destination storage node ID.

FIG. 9 is a diagram illustrating an example of replication management information stored by the storage node 3 (SN3). The replication management information illustrated in FIG. 9 is stored in the second storage unit 34 in the storage node 3 (SN3). The replication management information illustrated in FIG. 9. Is obtained by copying a record included in the replication management information illustrated in FIG. 5 which is stored by the proxy server 2. The record Includes SN3 as the replication source storage node ID or the replication destination storage node ID.

<Example of Process According to Embodiment>

Figure 10:
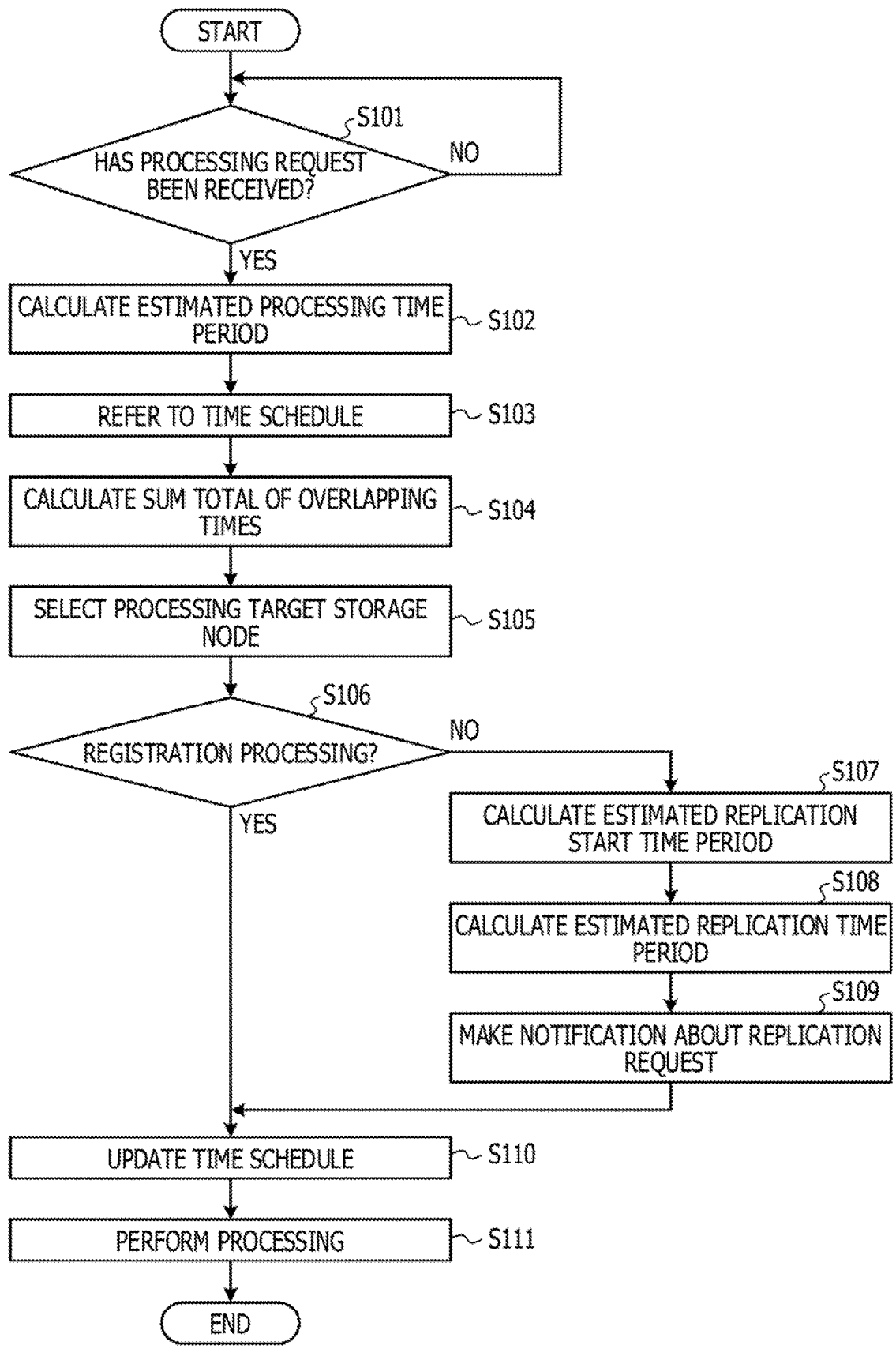
FIG. 10 is a flowchart illustrating an example of a process according to an embodiment.

FIG. 10 is a flowchart illustrating an example of a process according to an embodiment. The first calculation unit 22 determines whether a processing request has been received from the client server 1 (S101). In the case of NO in S101, the process does not proceed. The processing request is, for example, the registration processing request or the reference processing request.

In the case of YES in S101, the first calculation unit 22 calculates for each of the storage nodes 3 an estimated processing time period that is the estimated value of a time period desired for requested processing based on a time period desired for the processing in the past (S102). The estimated processing time period is, for example, Tp represented in Equation (1) or Tg represented in Equation (2).

The selection unit 23 refers to a time schedule (see, for example, FIG. 6) recording the schedule of processing at each of the storage nodes 3 (S103). The selection unit 23 calculates a sum total ST(n) of overlapping times between the estimated processing time period calculated by the first calculation unit 22 and a recorded schedule (S104). Based on the calculated sum total ST(n), the selection unit 23 selects one of the storage nodes 3 as the storage node 3 where the requested processing is to be performed (S105). For example, the selection unit 23 selects the storage node 3 having the smallest value of the calculated sum total ST(n).

In a case where the requested processing is the registration processing (YES in S106), the second calculation unit 24 calculates the estimated replication start time period RTs based on a past execution history (S107). The second calculation unit 24 calculates an estimated replication start time by adding the estimated start time period RTs to a registration processing start time.

The third calculation unit 25 calculates an estimated replication time period that is the estimated value of a time period desired for replication (S108). The third calculation unit 25 calculates an estimated replication ending time by adding the estimated replication time period to the estimated replication start time.

The first communication unit 21 notifies each storage node of a request for replication processing (S109).

In the case of NO in S106 or after the processing of S109, the first management unit 26 updates the time schedule including the schedule of each of the storage nodes 3 (S110). The first management unit 26 updates the time schedule based on, for example, the estimated processing time period calculated by the first calculation unit 22, the estimated start time period calculated by the second calculation unit 24, and the estimated replication time period calculated by the third calculation unit 25.

The first control unit 29 performs the requested processing (S111). For example, in a case where a registration processing request has been received along with registration target data in S101, the first control unit 29 transmits the registration target data to the storage node 3 selected in S105 via the first communication unit 21. For example, in a case where a data reference processing request has been received in S101, the first control unit 29 acquires reference target data from the storage node 3 selected in S105 via the first communication unit 21 and transmits the reference target data to the client server 1.

As described above, the proxy server 2 manages not only the schedule of processing that the proxy server 2 directly performs upon the storage node 3 but also the schedule of replication performed between the storage nodes 3. The proxy server 2 selects a processing target apparatus using a schedule including the schedule of replication. This leads to the increase in the accuracy of calculating the processing load of a storage node and the suppression of a load Imbalance between the storage nodes 3. The suppression of a load imbalance between the storage nodes 3 leads to the Improvement in the performance of an entire storage system.

The proxy server 2 manages the time schedule including the schedule of replication at each of the storage nodes 3 and therefore does not have to receive the state of each of the storage nodes 3. This leads to the reduction in the load of communication between the proxy server 2 and each of the storage nodes 3.

Figure 11:
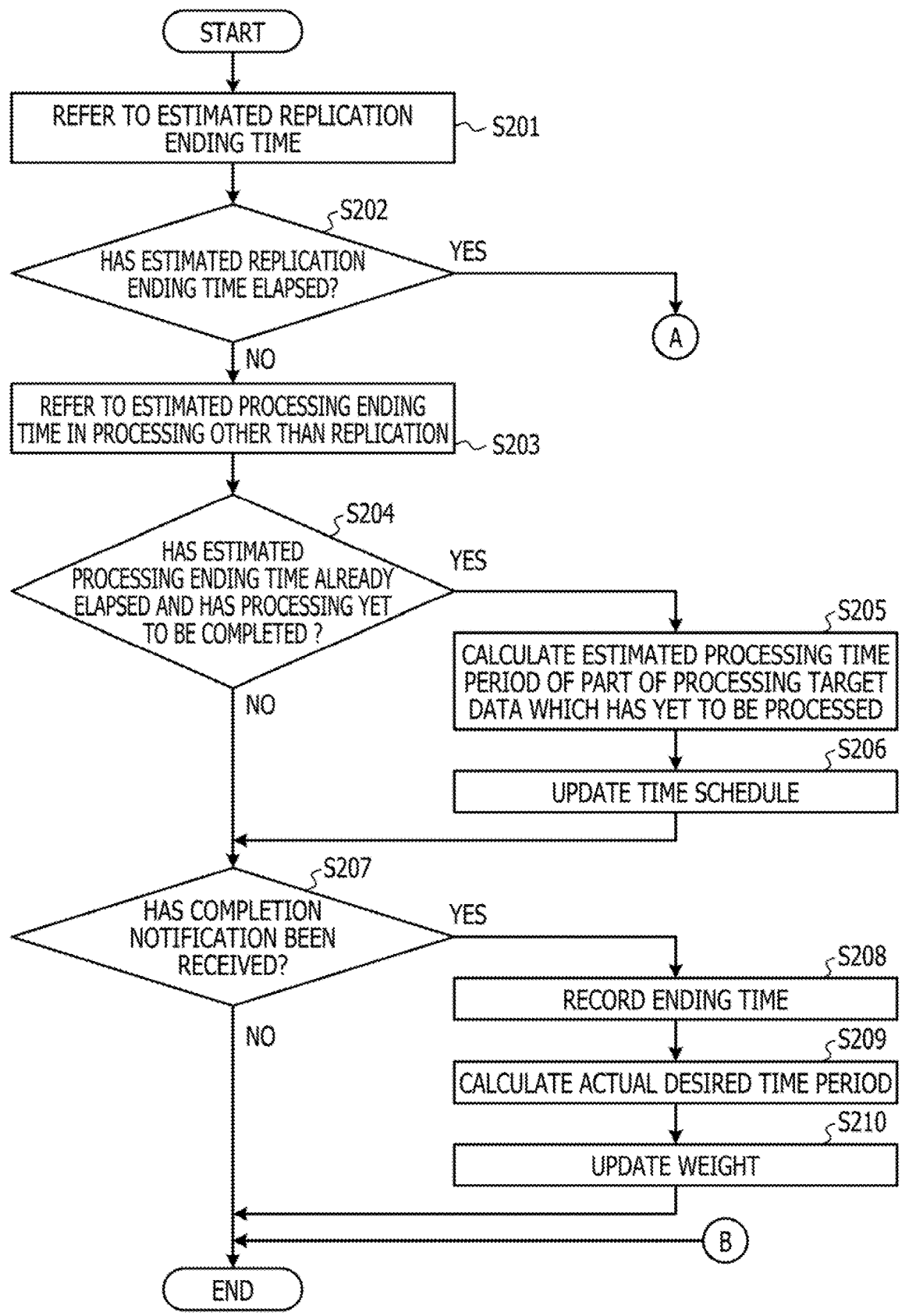
FIG. 11 is a (first) flowchart illustrating an example of a recalculation process.
Figure 12:
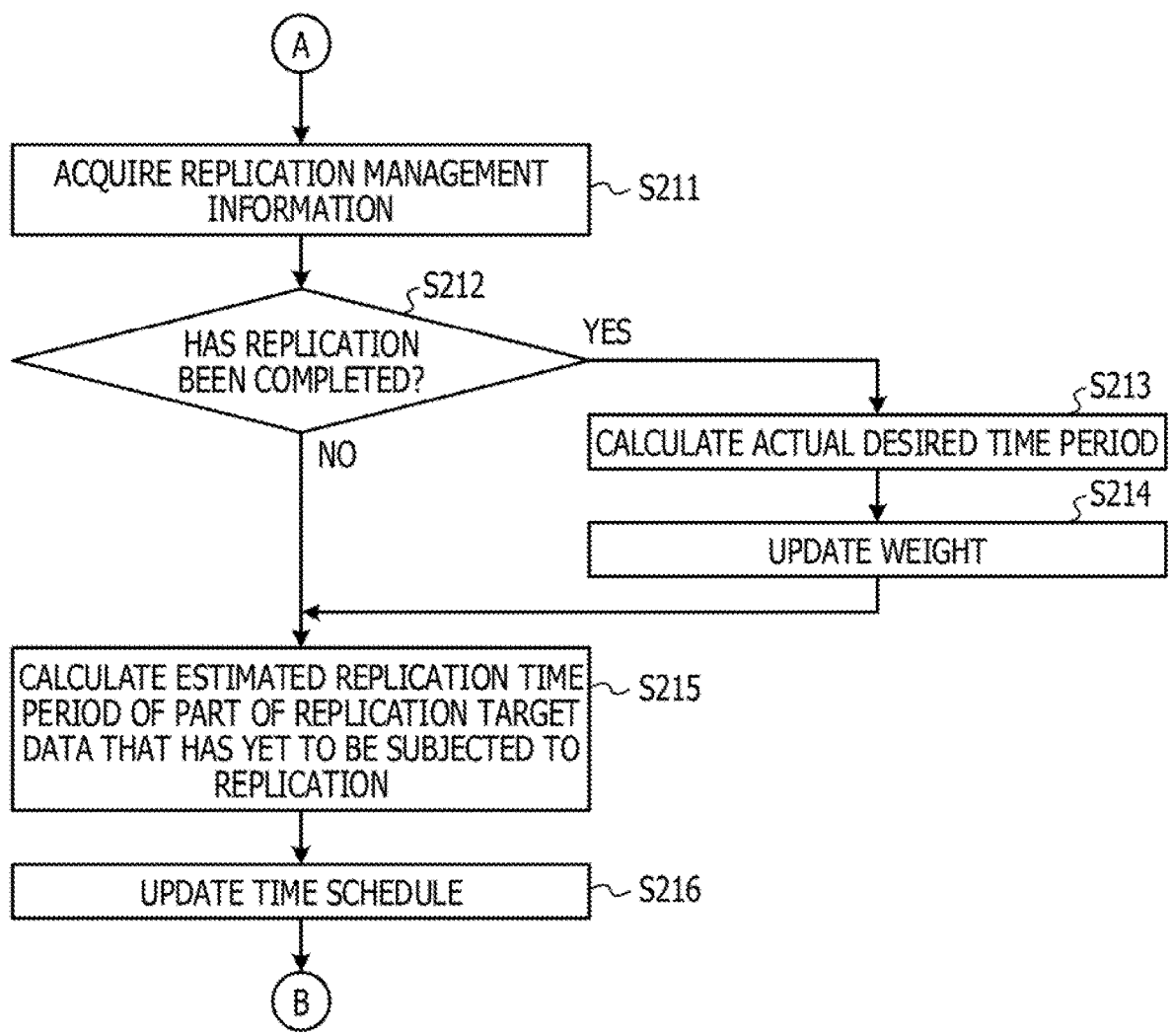
FIG. 12 is a (second) flowchart illustrating an example of a recalculation process.

FIGS. 11 and 12 are flowcharts illustrating an example of a recalculation process. For example, the process illustrated in FIG. 11 is started after the processing of S111 in FIG. 10. The process illustrated in FIGS. 11 and 12 is repeatedly performed during processing requested by the client server 1.

The recalculation unit 27 refers to the estimated processing ending time of replication which is included in the time schedule (S201). For example, the recalculation unit 27 refers to the estimated processing ending time of processing whose processing type is "RPG" or "RPP" in the time schedule.

The recalculation unit 27 determines whether an estimated replication time has elapsed (S202). In the case of NO in S202, the recalculation unit 27 refers to an estimated processing ending time of processing other than replication which is included in the time schedule (S203). For example, the recalculation unit 27 refers to the estimated processing ending time of processing whose processing type is "PUT" or "GET" in the time schedule.

The recalculation unit 27 determines whether the estimated processing ending time has already elapsed and processing has yet to be completed (S204). The recalculation unit 27 can know the completion of processing because the recalculation unit 27 receives a completion notification from the target storage node 3 at the time of the completion of processing.

In the case of YES in S204, the recalculation unit 27 calculates the estimated processing time period of part of processing target data which has yet to be processed (S205). The recalculation unit 27 calculates an estimated ending time by adding the estimated time period calculated in S205 to a current time.

The recalculation unit 27 updates the estimated ending time in the time schedule based on the recalculated estimated time period (S206).

In the case of NO in S204 or after the processing of S206, the first management unit 26 determines whether a processing completion notification has been received from the storage node 3 (S207). This completion notification does not include a completion notification regarding replication.

In the case of YES in S207, the first management unit 26 records an ending time in the processing request management information (S208). The updating unit 28 calculates an actual processing time period based on a request receipt time and the processing ending time in the processing request management information (S209). As described above, in this embodiment, a time period between the receipt of a processing request at the proxy server 2 and the start of processing at the proxy server 2 is disregarded. Therefore, the request receipt time and a processing start time are the same.

The updating unit 28 updates the weight (Wgs or Wps) based on the estimated processing time period and the actual desired time period (S210).

In a case where the estimated replication time has already elapsed (YES in S202), the process proceeds from "A" to S211 in FIG. 12. The recalculation unit 27 acquires replication management information from the processing target storage node 3 (S211). The recalculation unit 27 determines whether replication has been completed (S212). For example, the recalculation unit 27 determines that replication has been completed in a case where an ending time is recorded in the record of the determination target in the acquired replication management information.

In this embodiment, a notification is not transmitted from the storage node 3 to the proxy server 2 at the time of completion of replication. The recalculation unit 27 therefore acquires the replication management Information to determine whether replication has been completed. In a case where a notification is transmitted from the storage node 3 to the proxy server 2 at the time of completion of replication, the recalculation unit 27 may determine that replication has been completed when receiving a notification.

In the case of YES in S212, the updating unit 28 calculates an actual time period desired for replication based on a start time and an ending time in the replication management information (S213). The updating unit 28 updates the weight (Wps) based on the estimated replication time period and the actual replication desired time period (S214).

In the case of NO in S212 or after the processing S214, the recalculation unit 27 calculates the estimated replication time period of part of replication target data that has yet to be subjected to replication (S215). The recalculation unit 27 calculates an estimated ending time by adding the estimated time period calculated in S215 to a current time.

The recalculation unit 27 updates an estimated ending time in the time schedule based on the recalculated estimated time period (S216). After the processing of S216, the process proceeds to "B" and ends.

As described above, in a case where processing is not completed at the estimated processing ending time or replication is not completed at the estimated replication ending time, the recalculation unit 27 recalculates an estimated time period. The recalculation unit 27 updates the estimated ending time in the time schedule based on the recalculated estimated time period. As a result, the accuracy of the time schedule can be improved and the accuracy of calculating the processing load of the storage node 3 can be improved.

At the time of completion of replication or another processing, the updating unit 28 updates a weight used for the calculation of the estimated processing time period or the estimated replication time period. This leads to the improvement in the accuracy of the next calculation of an estimated processing time period and an estimated replication time period.

<Application Example of Processing According to Embodiment>

An application example of processing according to an embodiment will be described below. FIG. 13 is a diagram illustrating a time schedule in an application example. The time schedule illustrated in FIG. 13 is based on the same information as the time schedule illustrated in FIG. 6. However, the time schedule illustrated in FIG. 13 differs from the time schedule illustrated in FIG. 6 in that arrows are illustrated between an estimated processing start time and an estimated processing ending time.

The processing request management Information in the application example is the same as that illustrated in FIG. 4, and the replication management information in the application example is the same as that illustrated in FIG. 5. The storage node 3 having the storage node ID of SN1 is referred to as SN1. The storage node 3 having the storage node ID of SN2 is referred to as SN2. The storage node 3 having the storage node ID of SN3 is referred to as SN3.

(1) Processing involving registration processing request (processing request ID: MSG10)

It is assumed that the proxy server 2 has received a data registration processing request from the client server 1 at 8:10. The first management unit 26 assigns "MSG10" to the registration processing request as a processing request ID, assigns "OBJ10" to the registration processing request as an object ID, and records the registration processing request in processing request management information. The first management unit 26 records the data size (100 MB) of received registration target data.

The first calculation unit 22 calculates for each of the storage nodes 3 the estimated time period Tp taken by the proxy server 2 to write data in the storage node 3 using Equation (1). At 8:10 at which the registration processing request has been received, processing is assigned to none of the storage nodes 3. The values of Mgn and Mpn are therefore 0. Assuming that the p performance of all of the storage nodes 3 is 50 MB/minute and the value of Wps is 1, Tp of all of the storage nodes 3 becomes 2 minutes.

At 8:10 at which the registration processing request has been received, processing is assigned to none of the storage nodes 3. Accordingly, there is no processing overlapping the received processing request in a time schedule. The selection unit 23 therefore assigns MSG10 to SN1 having the smallest value of the storage node ID. In a case where there is no processing overlapping the received processing request in a time schedule, the selection unit 23 may select any of the storage nodes 3.

The first management unit 26 records "SN1" as a storage node ID corresponding to MSG10 in the processing request management information.

Since requested processing is the data registration processing, replication is performed. In this application example, SN1 performs replication upon SN2 and SN3. That is, SN1 transfers received registration target data to SN2 and SN3.

The second calculation unit 24 calculates the estimated start time period RTs between a time at which SN1 starts to register data and a time at which SN1 transfers data to SN2 and the estimated start time period RTs between a time at which SN1 starts to register data and a time at which SN1 transfers data to SN3.

The calculation of the estimated start time period RTs at Sn2 will be described. The unit of the estimated start time period RTs is minute. For example, the second calculation unit 24 acquires Mgn, Mpn, and RTs at the start of the last processing at SN2. It is assumed that the vector E for SN2 is (1, 1, 2).

The second calculation unit 24 calculates the average of Mgn, Mpn, and RTs in replication processing performed in the past. It is assumed that the vector A for SN2 is (2, 2, 3). As illustrated in the time schedule in FIG. 13, since SN2 has no schedule at the time of calculation (8:10), the values of Mgn and Mpn are 0. Accordingly, the equation of P=(0, 0, RTs) is established.

The vector U becomes (1, 1, 1) based on the vectors E and A. In a case where the values of the vectors E, P, and U are substituted into the equation of a straight line, −1/1=−1/1=Z3−2 is derived. The equation of Z3=RTs=1 (minute) is established. Accordingly, the estimated replication start time at SN2 is 8:11 that is one minute after 8:10.

The second calculation unit 24 also calculates the replication estimated start time period RTs at SN3. It is assumed that a calculation result of the estimated start time period RTs is 2 minutes. Accordingly, the estimated replication start time at SN3 is 8:12 that is two minutes after 8:10.

The third calculation unit 25 calculates a time period desired for replication at each of SN2 and SN3 using Equation (1). It is assumed that a time period desired for replication at each of SN2 and SN3 is 2 minutes. The third calculation unit 25 calculates an estimated processing ending time by adding the calculated desired time period to the estimated replication start time. The estimated processing ending time of replication (RPP) at SN2 is 8:13. The estimated processing ending time of replication (RPP) at SN3 is 8:14.

(2) Processing Involving Reference Processing Request (Processing Request ID: MSG20)

The proxy server 2 receives a data reference processing request from the client server 1 at 8:11. The first management unit 26 assigns "MSG20" to the reference processing request as a processing request ID, assigns "OBJ20" to the reference processing request as an object ID, and records the reference processing request in the processing request management Information. The first management unit 26 records the data size (40 MB) of received reference target data.

The first calculation unit 22 calculates the estimated time period Tg taken by the proxy server 2 to read data from the storage node 3 in the reference processing using Equation (1). Assuming that g performance is 40 MB/minute and Wgs is 1, Tg at SN2 and SN3 becomes 1 minute.

As illustrated in the schedule in FIG. 13, writing (RPP) in replication is performed at SN2 in a period from 8:11 to 8:13. On the other hand, in a period from 8:11 to 8:12, processing is not performed at SN3. The value of ST(n) at SN2 is 1, and the value of ST(n) at SN3 is 0. The selection unit 23 therefore selects SN3 having the smallest value of ST(n) as the target of processing requested by the reference processing request (MSG20).

(3) Processing Involving Reference Processing Request (Processing Request ID: MSG30)

The proxy server 2 receives a data reference processing request from the client server 1 at 8:12. The first management unit 26 assigns "MSG30" to the reference processing request as a processing request ID, assigns "OBJ30" to the reference processing request as an object ID, and records the reference processing request in the processing request management information. The first management unit 26 records the data size (80 MB) of received reference target data.

The first calculation unit 22 calculates the estimated time period Tg taken by the proxy server 2 to read data from the storage node 3 in the reference processing using Equation (1). Assuming that g performance is 40 MB/minute and Wgs is 1, Tg at SN2 and SN3 becomes 2 minutes.

As illustrated in the schedule in FIG. 13, writing (RPP) in replication is performed at SN2 in a period from 8:11 to 8:13. On the other hand, in a period from 8:12 to 8:14, writing (RPP) in replication is performed at SN3. The value of ST(n) at SN2 is 1, and the value of ST(n) at SN3 is 2. The selection unit 23 therefore selects SN2 having the smallest value of ST(n) as the target of processing requested by the reference processing request (MSG30).

(4) Processing after Completion of Requested Processing

The updating unit 28 updates the weight (Wgs or Wps) based on the estimated processing time period and an actual processing time period at the time of completion of processing.

For example, it is assumed that the estimated processing time period calculated in the processing (2) is 1 minute but an actual desired time is 0.75. The updating unit 28 calculates Wgs using Equation (2-1). A calculation result is 0.66.

It is assumed that the estimated processing time period calculated in the processing (3) is 2 minutes but an actual desired time is 1.7 minutes. The updating unit 28 calculates Wgs using Equation (2-1). A calculation result is 0.65.

The first management unit 26 records an ending time in the processing request management Information. In a case where replication has been completed at the estimated replication ending time, the first management unit 26 acquires replication management information from each of the storage nodes 3 and records a start time and an ending time in the replication management information.

In a case where the estimated processing ending time has already elapsed and processing has yet to be completed, the recalculation unit 27 calculates the estimated processing time period of processing target data which has yet to be processed and updates the time schedule based on the calculated estimated time period. In this application example, since each piece of processing has been completed at the estimated processing ending time, the recalculation unit 27 does not perform recalculation.

<Exemplary Hardware Configuration of Proxy Server 2>

Figure 14:
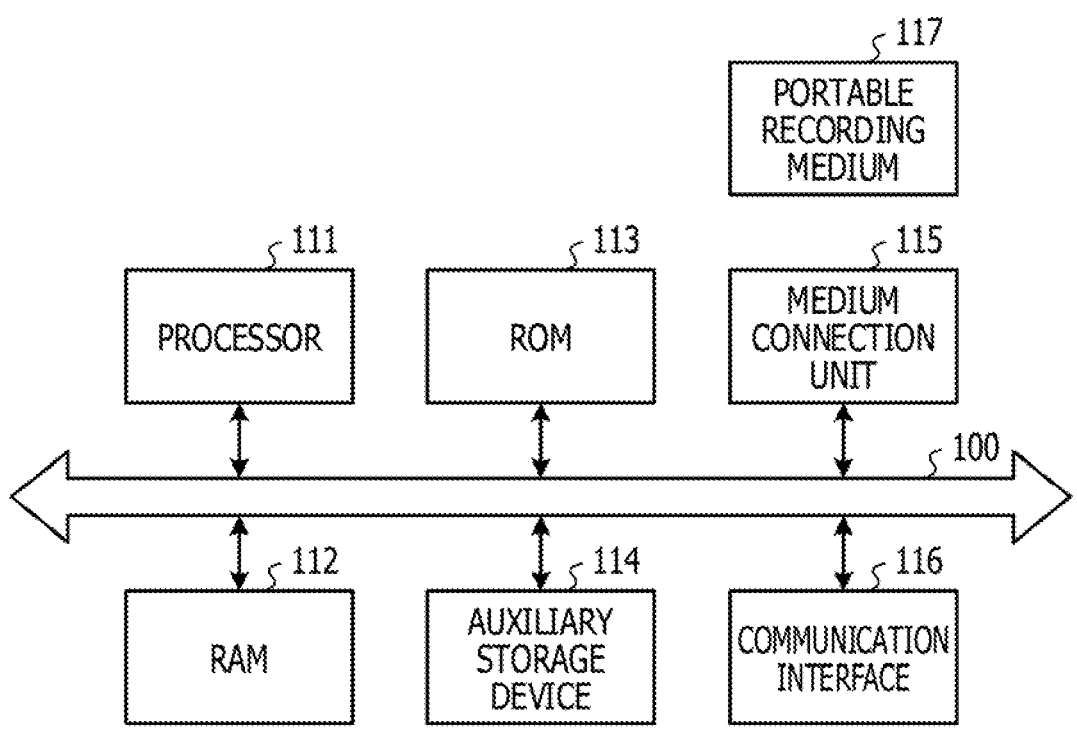
FIG. 14 is a diagram illustrating an exemplary hardware configuration of a proxy server.

Next, an exemplary hardware configuration of the proxy server 2 will be described with reference to FIG. 14. As illustrated in FIG. 14, a processor 111, a random access memory (RAM) 112, and a read-only memory (ROM) 113 are connected to a bus 100. An auxiliary storage device 114, a medium connection unit 115, and a communication interface 116 are connected to the bus 100.

The processor 111 executes a program deployed in the RAM 112. As a program to be executed, a processing distribution program for performing processing according to an embodiment may be used.

The ROM 113 is a nonvolatile storage device for storing a program deployed in the RAM 112. The auxiliary storage device 114 is a storage device for storing various pieces of information. For example, as the auxiliary storage device 114, a hard disk drive or a semiconductor memory may be used. A processing distribution program for performing processing according to an embodiment may be recorded in the auxiliary storage device 114.

The medium connection unit 115 is provided in a manner that it is connectable to a portable recording medium 117. As the transportable recording medium 117, a transportable memory, an optical disc such as a compact disc (CD) or a digital versatile disc (DVD), or a semiconductor memory may be used. A processing distribution program for performing processing according to an embodiment may be recorded in the portable recording medium 117.

The first storage unit 30 illustrated in FIG. 2 may be realized by, for example, the RAM 112 or the auxiliary storage device 114. The first communication unit 21 illustrated in FIG. 2 may be realized by the communication interface 116. The first calculation unit 22, the selection unit 23, the second calculation unit 24, the third calculation unit 25, the first management unit 26, the recalculation unit 27, the updating unit 28 and the first control unit 29, which are illustrated in FIG. 2, may be realized by the processor 111 executing the given processing distribution program.

Any of the RAM 112, the ROM 113, the auxiliary storage device 114, and the portable recording medium 117 is an example of a tangible computer-readable storage medium. These tangible storage media are not a temporary medium such as a signal carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   when a request for a processing is received, calculating, for each of a plurality of apparatuses, an estimated processing time period that is an estimated value of a time period taken to perform the processing based on a processing time period in a past execution history of the processing;
   referring to a time schedule that records a schedule of processing including replication for each of the plurality of apparatuses;
   calculating, for each of the plurality of apparatuses, a sum total of overlapping times between the calculated estimated processing time period and the recorded time schedule;
   selecting an apparatus having a smallest value of the calculated sum total as a target apparatus for performing the requested processing from among the plurality of apparatuses; and
   executing the process by using the selected target apparatus.

2. The storage medium according to claim 1, further comprising:
   calculating, when the processing is registration of data, an estimated start time period that is an estimated value of a time period from a time at which the target apparatus starts the registration of data to a time at which the target apparatus transfers the data to the apparatus that is a replication destination based on a past execution history;
   calculating, when the processing is registration of data, an estimated replication time period that is an estimated value of a replication time period based on a replication time period in a past execution history; and
   updating the time schedule based on the estimated processing time period, the estimated start time period, and the estimated replication time period.

3. The storage medium according to claim 2,
   wherein the calculation of the estimated replication time period includes calculating, when the replication is not completed at an estimated replication ending time calculated based on the estimated replication time period, an estimated replication time period of part of the data to be registered which has yet to be subjected to the replication, and
   wherein the updating of the time schedule includes updating the time schedule based on the calculated estimated replication time period.

4. The storage medium according to claim 2, further comprising updating, upon completion of the replication, a weight used for calculation of the estimated replication time period based on the estimated replication time period and an actual time period desired for the replication.

5. The storage medium according to claim 2, wherein the calculating the estimated replication time period includes calculating the estimated replication time period based on an average data write amount per hour in the past.

6. The storage medium according to claim 1, further comprising:
   calculating, when the processing is not completed at an estimated processing ending time calculated based on the estimated processing time period, an estimated processing time period of part of the data to be processed which has yet to be subjected to the processing; and
   updating the time schedule based on the calculated estimated processing time period.

7. The storage medium according to claim 1, further comprising updating, upon completion of the processing, a weight used for calculation of the estimated processing time period based on the estimated processing time period and an actual time period desired for the processing.

8. The storage medium according to claim 1, wherein the calculating the estimated processing time period includes calculating, when the processing is registration of data, the estimated processing time period based on an average data write amount per hour in the past.

9. The storage medium according to claim 1, wherein the calculating the estimated processing time period includes calculating, when the processing is reference of data, the estimated processing time period based on an average data read amount per hour in the past.

10. The storage medium according to claim 1, wherein the time schedule is information in which a type of the processing, an estimated processing start time and an estimated processing ending time are associated with each other for each of the plurality of apparatuses.

11. The storage medium according to claim 10, wherein the type of the processing includes a data registration request, a data reference request, a read processing at a replication source and a write processing at a replication destination.

12. A processing distribution method performed by a processor in an information processing apparatus, the processing distribution method comprising:
   when a request for a processing is received, calculating, for each of a plurality of apparatuses, an estimated processing time period that is an estimated value of a time period taken to perform the processing based on a processing time period in a past execution history of the processing;
   referring to a time schedule that records a schedule of processing including replication for each of the plurality of apparatuses;
   calculating, for each of the plurality of apparatuses, a sum total of overlapping times between the calculated estimated processing time period and the recorded time schedule;
   selecting an apparatus having a smallest value of the calculated sum total as a target apparatus for performing the requested processing from among the plurality of apparatuses; and
   executing the process by using the selected target apparatus.

13. An information processing apparatus comprising:

a memory; and a processor coupled to the memory and configured to:

when a request for a processing is received, calculate, for each of a plurality of apparatuses, an estimated processing time period that is an estimated value of a time period taken to perform the processing based on a processing time period in a past execution history of the processing, refer to a time schedule recording a schedule of processing including replication at each of the plurality of apparatuses, calculate, for each of the plurality of apparatuses, a sum total of overlapping times between the calculated estimated processing time period and the recorded time schedule, select an apparatus having a smallest value of the calculated sum total as a target apparatus for performing the requested processing from among the plurality of apparatuses, and execute the process by using the selected target apparatus.

* * * * *